United States Patent
O'Toole, Jr.

(10) Patent No.: US 7,269,733 B1
(45) Date of Patent: Sep. 11, 2007

(54) RELIABLE EMBEDDED FILE CONTENT ADDRESSING

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 10/410,967

(22) Filed: Apr. 10, 2003

(51) Int. Cl.
  *G06F 7/04* (2006.01)
(52) U.S. Cl. .............................. 713/175; 726/6; 705/75
(58) Field of Classification Search ................. 726/12, 726/14, 10, 7; 713/175; 705/77
See application file for complete search history.

(56) References Cited

U.S. PATENT DOCUMENTS

| | | | | |
|---|---|---|---|---|
| 5,903,882 A | * | 5/1999 | Asay et al. | 705/44 |
| 6,085,976 A | * | 7/2000 | Sehr | 235/384 |
| 6,145,079 A | * | 11/2000 | Mitty et al. | 713/170 |
| 6,829,584 B2 | * | 12/2004 | Loveland | 705/7 |
| 6,957,199 B1 | * | 10/2005 | Fisher | 705/78 |
| 7,069,234 B1 | * | 6/2006 | Cornelius et al. | 705/26 |
| 2002/0104026 A1 | * | 8/2002 | Barra et al. | 713/202 |
| 2003/0204729 A1 | * | 10/2003 | Rockwood et al. | 713/176 |
| 2004/0199790 A1 | * | 10/2004 | Lingafelt et al. | 713/201 |

FOREIGN PATENT DOCUMENTS

WO    WO 01/09701 A1 *  2/1999

* cited by examiner

Primary Examiner—Matthew B Smithers
(74) Attorney, Agent, or Firm—Chapin IP Law, LLC; Barry W. Chapin, Esq.

(57) ABSTRACT

Conventional archive and retrieval systems inadequately identify the archival data with sufficient granularity to associate data items with retrieval performance, and do not define a recourse following loss of archived data. A method for file archiving, identification, and failure recourse facilitates successive disposition by generating an authenticated receipt of files transferred for storage via an authentication instrument that is verifiable towards both the data stored and a corresponding agreement. The authenticated receipt provides nonrepudiation assurances about the content of the file and the contractual terms under which the file was stored via an authenticating signature of the archive storage server which associates the file content with the contractual terms. The nonrepudiation assurances allow verification of the content of the archived file through a checksum or hash, and the authenticated receipt further indicates the terms of the contractual agreement for recourse by the client depositor in the event of loss of the file.

28 Claims, 5 Drawing Sheets

RELIABLE EMBEDDED FILE CONTENT ADDRESSING

BACKGROUND OF THE INVENTION

Conventional content delivery networks (CDNs) provide access methods to published data objects, such as documents, files, graphical entities, and other media. In such a network, data is typically written once and retrieved many times by a plurality of users. For example, a large corporation may establish a CDN for customer service, operable to store entities such as user manuals, FAQs (frequently asked questions), technical service bulletins, historical reference documents for obsolete products, and other support items. A content provider typically outsources a conventional CDN to a service provider host responsible for maintaining the CDN. A service level agreement (SLA) defines the responsibilities of the CDN host to provide timely content to requesting users, and defines specific performance criteria that the host will achieve for retrieval requests. For example, a SLA may specify that a CDN website is to respond to a volume of 1000 requests an hour each in 5 seconds or less.

A similar model is applicable to a long-term archive or backup environment. A system operator or other support entity typically provides backup for conventional information systems according to a periodic schedule to guard against data loss from accidental deletions, hardware failure, and user error. Often, an organization delegates the archive task to a third party according to an SLA. A conventional SLA may specify a certain volume of data and duration of archive during which the archiver is expected to maintain and retrieve requested data as needed.

One method of providing content is shown by "FreeFlow", a CDN product marketed commercially by Akamai Technologies, Inc. of Cambridge Mass. FreeFlow establishes a CDN including fast access cache servers which store content of requested web pages to offload processing demands from hits on a main target website. This system uses fingerprinting of the data to identify and maintain cache copies in the fast access cache servers distinct from the main website. The FreeFlow system, therefore, maintains high speed cache data proximate to a requester, and invokes fingerprinting to avoid staleness of the data. Therefore, the FreeFlow system appears to identify the content of the web page data for fast access, independently of an association to other extrinsic data or information objects.

Other systems that purport to provide backup services include STORos storage manager for backup, available commercially by StorageNetworks of Waltham, Mass., which suggests a unified view of backup architectures across multiple backup servers, software packages, and locations. Another entity concerned with services according to SLAs includes Scale8, Inc. of San Francisco, Calif., which provides Scale8 Global Storage Service and a family of Network-Attached Storage (NAS) products.

SUMMARY OF THE INVENTION

Conventional SLAs and the systems they pertain to suffer from a variety of deficiencies. Such conventional SLAs do not adequately identify the archival data with sufficient granularity to itemize performance related events. Difficulties arise when a retrieval request fails, and the conventional SLA does not adequately define the parameters or penalties associated with such failure.

A conventional CDN SLA typically focuses on retrieval performance, and may describe guarantees and penalties pertaining to the speed and accuracy of retrieval. Similar guarantees are applicable to a conventional archive storage system SLA. However, such a conventional archive storage system occupies a different context than the CDN model above, and accordingly, has a somewhat different focus. A conventional archive storage system is more concerned with the integrity and accuracy of retrieval, and less so on the speed with which the retrieval occurs. A conventional archive storage system places much emphasis on the penalties for failure to faithfully or adequately reproduce the data, rather than the performance implications of the retrieval mechanics.

For example, a conventional storage archive SLA may specify that the archival server respond to retrieval requests within a specified time, but may not identify the penalties for failure to timely respond, or, in a more serious vein, may not specify the penalties for partial or total loss or compromise of the data. Typically, the archiver does not reference archived data until a user requests such data because of failure at the main operational site. Only at that time does the archiver learn of problems with a corrupt archive. It is difficult for a conventional archive client to identify the scope and magnitude of such loss, because the units, or quantity of data lost are not enumerated in the corresponding SLA. For example, the conventional SLA may not associate a cost value per file, or allow classification of some files as more valuable than others. Further, it may be difficult for the archive client to validate the returned data to ensure that it is, in fact, the same data that the client had sent for archive.

Accordingly, configurations of the invention provide a data archive system that archives data with an enumerable degree of granularity that identifies each of the data units (e.g., files) for archive, associates each of the data units with contractual terms providing for retrieval and loss of each of the data units, and validates the data so retrieved to ensure that the storage server has, in fact, complied with the retrieval request. Such an arrangement discretely identifies each data object for archive, and indicates deterministic, identifiable insurance terms governing loss, compromise, or other shortfall of compliance with the SLA. Validation of the archival data identifies the scope of the loss by confirming accuracy of the data that the storage server was able to reproduce faithfully. In the event of loss, the insurance terms define the penalties for failure to reproduce the data, and limit the responsibility by confirming accuracy of the retrievals.

The present invention significantly overcomes the problems associated with conventional systems for file archiving, identification, and recourse by generating and providing an authenticated receipt of files or other data transferred for storage or other processing. In one configuration, the authenticated receipt takes the form of an authentication instrument that is verifiable towards both the data stored and an agreement (e.g., contract) binding the archive client and the archiver. The authenticated receipt provides nonrepudiation assurances about the content of the file and the contractual terms under which the file or other data was stored or otherwise processed via an authenticating signature of the archiver, or storage server that associates the file content with the contractual terms. The nonrepudiation assurances allow verification of the content of the archived file through a checksum or hash, and the authenticated receipt indicates the terms of the contractual agreement for recourse by the archive client in the event of loss or other disposition of the file as defined by the contractual terms. In this manner, an archive client selects a file for insured storage along with contractual terms covering the file, and receives an authenticated receipt from the archiver (data insurer) which associates, or binds, the identity of the file, the verifiable content of the file, and defines recourse terms in the event of loss of the file.

Therefore, the authenticated receipt, or authentication instrument, allows the archive client to deterministically assess damages for loss of the file, allows the archiver to identify liability and plan redundant storage accordingly, and confirms whether or not the purported retrieved data is accurate. In contrast, conventional systems do not provide a mechanism for recourse after an unsuccessful retrieval due to a failed archive medium or other problem, and provide no guidance as to the value or content of the data so archived, leaving the archive client to prove damages and establish the scope of the loss through alternate means.

In the invention as defined by the present claims, the archive client, or user, transmits files or a set of files, or an indication thereof (e.g. file handle) to the data insurer along with a selection of contractual insurance terms, such as by a menu selection of an agreement of fees for storage, damages or penalties for failure to reproduce the file, and an expiration date after which the file is deleted or overwritten. The data insurer has a storage server to receive the files and the authentication key, and generates a checksum or hash from the content of the file. The checksum or hash serves as a validation token to later identify and verify the content of the file upon retrieval. The selected contractual insurance terms include a reference to a verifiable base contract, and optionally, to computed insurance parameters which may be user specified or based on the set of files (e.g., file size, loss damages per file, expiration date, etc.). A receipt manager in the storage server builds a receipt by aggregating the file hash and the selected contract, along with the date, the identity of the archive client and the data insurer entities, and an optional mnemonic identifier to facilitate recognition by the user. An authenticator in the storage server of the data insurer then authenticates the receipt with the credential (e.g. private key) of the data insurer, and returns the authenticated receipt to the user such that the user may maintain the receipt to recover the set of files and irrefutably pursue other recourse for loss or compromise as specified in the contract.

More specifically, the present invention provides mechanisms and techniques that process information objects for archive storage to generate an authentication instrument (authenticated receipt) by identifying an information object to which a file archive provider is to apply a successive disposition, such as deletion or overwrite, and identifying contractual criteria specified by the archive client entity. A hash function determines a validation token indicative of the content of the information object for later verification of the data. The archive client elects a contract, or insurance, option via a service specifier indicative of contractual criteria corresponding to an obligation by the archive provider entity to perform the successive disposition of the information object on behalf of the client. The data insurer entity has an authenticating credential, such as a symmetric key or private key of a public key pair, for signing the receipt. The archive provider computes, from the authenticating credential, the authentication instrument by aggregating the validation token and the service specifier. The authentication instrument thereafter provides nonrepudiation assurances between the client entity and the archive provider entity about the content of the information object and the corresponding successive disposition by the archive provider.

In a particular file archive arrangement, the authentication instrument is operable as a filename adapted to be stored and identified by the archive client, in which computing the authentication instrument further includes determining a descriptive identifier, or mnemonic string, corresponding to the information object and indicative of the contents of the information object. The data insurer appends the descriptive identifier to the resulting authentication instrument.

The authentication instrument is a receipt confirming and binding the validation token and the service specifier as an indicator of the expected successive disposition of the file. The service specifier is a deterministic index, or pointer, to external contractual terms, verifiable by an external source such as a contract repository. The service specifier is therefore further indicative of contractual and/or insurance provisions applicable to conditional courses of action including the disposition of the file. The contractual terms may, in particular arrangements, include a destruction date of the information object, a disclosure recourse in the event of unintended disclosure of the information object, and a loss recourse such as a predetermined monetary amount in the event of a failure to recall the information object via the authentication instrument.

Further, the service specifier indicative of the contract may include one or more of external, well known verifiable terms, such as a stock price, embedded deterministic terms embedded in the information object such as a user specified liquidated damages amount per file, and definable terms computed from deterministic value specifications during the computing the authentication instrument, such as the file type or size.

Such definable terms, by way of example only, include the length of the data in the information object, the storage time of the information object, the monetary value of the information object, a compromise damage value (e.g. such as due to exposure of proprietary information) of the information object, and a retrieval time for the information object. Similarly, such external well known terms include an established standard promulgated by a third party and published via verifiable and ascertainable sources, such as a model agreement.

In another configuration, the insured archive involves integration with an established command protocol. In this configuration, the identification of the information object and the archival storage criteria, and the resultant computing of the authentication instrument, further involves identifying an external protocol having predetermined parameters, in which the external protocol is operable to transmit data over a public access network. In a particular exemplary arrangement, an NFS (Network File System) interface is employed to facilitate remote insured backup as defined herein. The syntax of the protocol associates the identity of the information object, the identity of the archival storage criteria, and the authentication instrument with the predetermined parameters of the protocol, such that the client specifies the information object, the archival storage criteria, and the authentication instrument via the predetermined parameters. Further, such an external protocol may be a legacy file transfer protocol applicable in preexisting applications to facilitate retrofitting and/or backward compatible operation.

The insured archive, in alternate arrangements, is implemented in an automated or semi-automated implementation in which identifying the information object is performed according to predetermined criteria. Such predetermined criteria includes, for example, a set of rules concerning information objects stored in files, the rules being indicative of time and storage constraints triggering the identifying to denote files for insured archive. Once the archive client identifies a set of potential files for archive, via tagging a particular directory, for example, a polling operation checks, at periodic intervals, each the potential files according to the rules, and selects, if a potential file conforms to the rules, the potential file for insured archive.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

The present invention provides techniques and mechanisms for file archiving, identification, and recourse by generating an authenticated receipt of files transferred for storage in the form of an authentication instrument that is verifiable against both the data stored and the agreement binding the archive client (user) and the archive provider. The authentication instrument provides nonrepudiation assurances about the content of the file and the contractual terms under which the file was stored via an authenticating signature of the user which associates the file content with the contractual terms. The nonrepudiation assurances allow verification of the content of the archived file through a checksum or hash, and the authenticated receipt further indicates the terms of the contractual agreement for recourse by the user in the event of loss or other disposition of the file as defined by the contractual terms. In this manner, a user selects a file for insured storage along with contractual terms covering the file, and receives an authenticated receipt from the archive provider or data insurer which associates the identity of the file, the verifiable content of the file, and defines recourse terms in the event of loss of the file.

In operation, the user, or archive client, transmits a file or a set of files, or an indication thereof (e.g. file handle) to the data insurer along with a selection of contractual insurance terms, such as by a menu selection of fees for storage, damages or penalties for failure to reproduce the file, and an expiration date after which the file is deleted or overwritten. The data insurer has a credential such as an authentication key or reference to a certificate in a public access directory (e.g., LDAP). The data insurer receives the files and identifies the authentication key, and generates a checksum or hash from the content of the file. The checksum or hash serves as a validation token to later identify and verify the content of the file upon retrieval.

The selected contractual insurance terms include a reference to a verifiable base contract, and optionally, to computed insurance parameters which may be user-specified or based on the set of files (e.g. file size, loss damages per file, expiration date, etc.). A receipt manager in the storage server builds a receipt by aggregating the file hash and the selected contract, the identity of the user and the data insurer entities, and an optional mnemonic identifier to facilitate recognition by the user. An authenticator in the storage server of the data insurer then authenticates the receipt with the credential (e.g., private key) of the data insurer, and returns the authenticated receipt to the user such that the user may maintain the receipt to recover the set of files and irrefutably pursue other recourse for loss or compromise as specified in the authenticated receipt.

Figure 1:
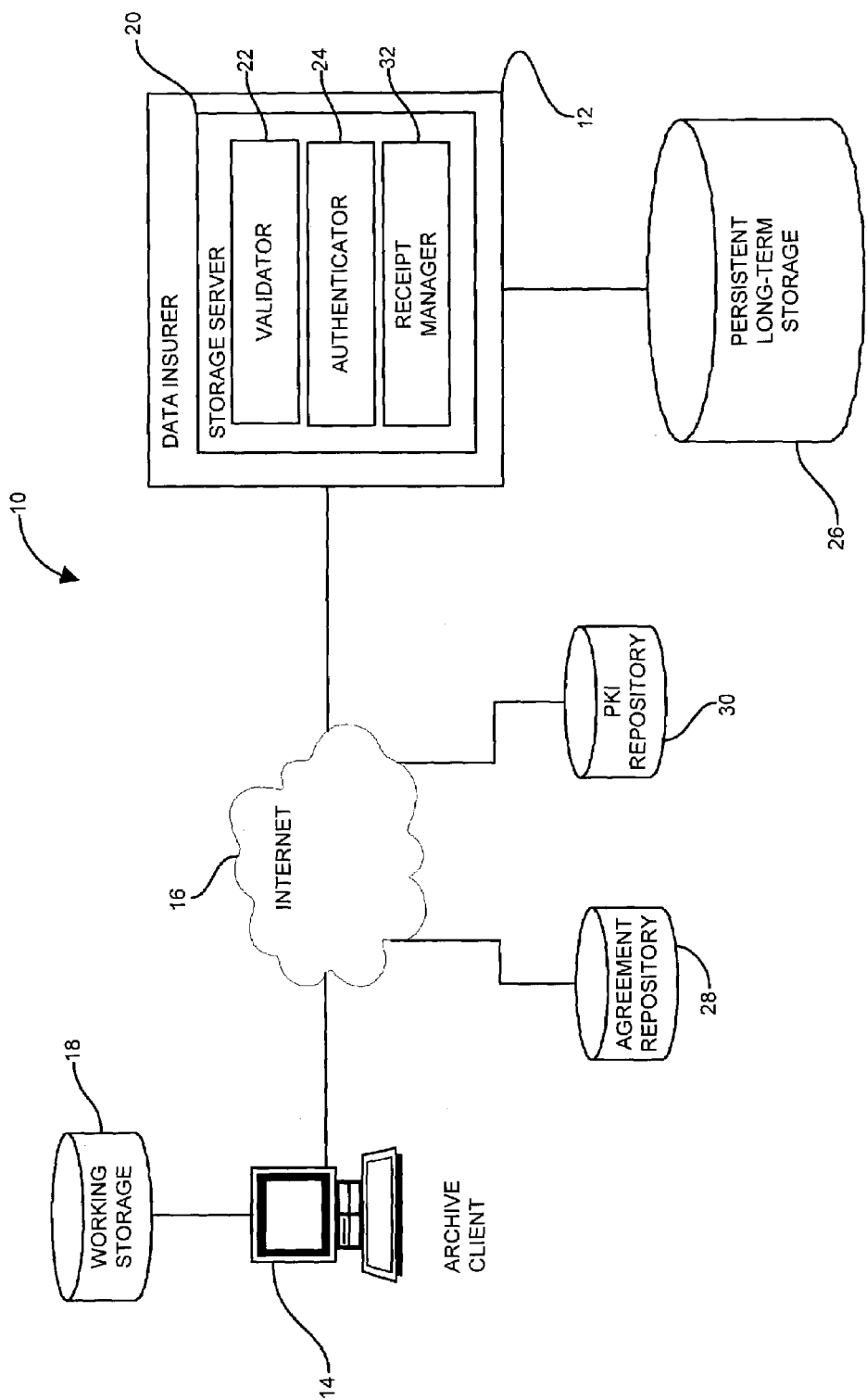
FIG. 1 illustrates an example of a computing system environment that is suitable for use in describing example operations of embodiments of the invention.

FIG. 1 illustrates an example of a computing system environment 10 that is suitable for use in describing example operations of embodiments of the invention. Referring to FIG. 1, the computing system environment 10 includes a data insurer 12 or archive provider and an archive client 14, or user, interconnected via a public access network 16 such as the Internet. The user 14 stores data objects such as files locally on a working storage repository 18. The data insurer 12 is operable to store the proprietary, working data of the user 14 as will be described further below, and includes a storage server 20 having a validator 22, an authenticator 24, and a receipt manager 32. The data insurer 12 is also in communication with a persistent long-term storage repository 26. Also connected to the network 16 are an agreement repository 28 and a Public Key Infrastructure (PKI) repository 30.

The client 14 maintains the working data storage area 18, such as a local hard drive on their PC or a department server, for example, for storing data objects, such as files, for insured long-term storage. The working storage area 18 may be accessible to the data insurer 12, or may be proprietary to the client 14, in which case the data insurer 12 receives access via access control mechanisms, actual transmission of the file, firewalls, or other mechanism for achieving controlled access. The client 14 selects the data objects for storage and transmits them via the network 16 to the data insurer 12. Selection of the files may be by graphical user interface (GUI), a command line interface (CLI), or other suitable method.

The data insurer 12 receives the selected files via the network 16, and retrieves the components for generating the receipt and storing the file. The agreement repository 28 is in communication with the data insurer 12 for storing a set of predetermined agreements, or insurance contracts, which the user selects for the files. The PKI repository 30 is also connected to the data insurer 12 and to the client 14 via the network 16, and stores authentication credential information, such as certificates and public keys, to authenticate the resulting receipt. The validator 22 and the authenticator 24 reside in the storage server 20 to perform a checksum on the data and to sign the receipt, respectively. The receipt manager 26, also in the storage server 20, assembles the receipt from the agreement, the authentication credentials, and the file for returning the authenticated receipt to the client 14, described further below. The persistent long-term storage facility 26 is in communication with the storage server 20 for storing the actual files from the working storage repository 18, and may be accessible by a variety of means, such as the network 16, a private LAN (Local Area Network), dedicated line, or magnetic media (e.g., tape, disk).

Figure 2:
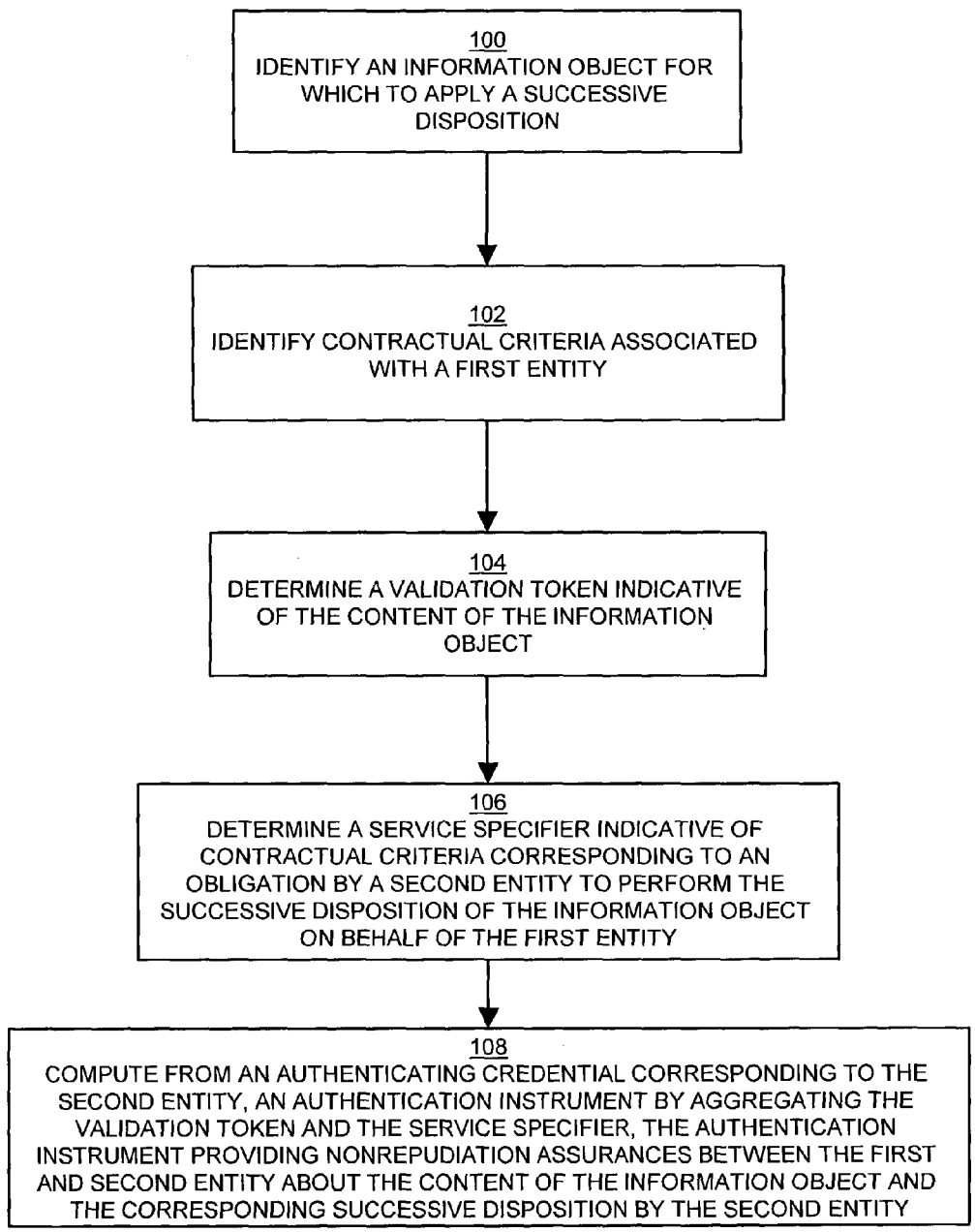
FIG. 2 shows a flowchart of the computing system of FIG. 1 processing an information object to produce a receipt with nonrepudiation assurances according to the present invention.

The above described interconnected elements will now be presented to describe example operations of embodiments of the invention. FIG. 2 shows a flowchart of the computing system of FIG. 1 processing an information object to produce an authenticated receipt with nonrepudiation assurances according to the present invention. Referring to FIGS. 2 and 1, the method for processing information objects for insured storage is shown. At step 100, the client 14 identifies an information object for which to apply a successive disposition. As described further below, the client 14 identifies the information object, or file, by several arrangements. In a particular configuration, the user may specify an explicit file specification, or a file handle to the actual file. Alternatively, a directory specification with a wildcard specification is used to designate a group of files. A semiautomated approach may also designate an archive directory which the storage server 20 periodically parses for new entries, and identify such new entries for insured archive storage. Other methods of designating a file or group of files for insured archive storage will be apparent to those skilled in the art.

At step 102, the client, or first entity, identifies contractual criteria for association with the successive disposition of the file. The storage server 20 receives the information object (file), and, at step 104, invokes the validator 22 to determine a validation token indicative of the content of the information object. The validator 22 applies a hash or checksum operation, such as SHA, MD4, MD5, or other similar function as is known in the art to determine the validation token corresponding to the contents of the file.

At step 106, the storage server 20 determines, using the contractual criteria from step 102, a service specifier indicative of the contractual criteria corresponding to an obligation by the data insurer 12 (second entity) to perform the successive disposition of the information object on behalf of the archive client 14 (first entity). The service specifier is, in a particular arrangement, an indicator to a known repository of contractual terms, such as a model agreement or menu selection of typical agreements, described further below. The indicator provides a reference to a verifiable source of contract terms with respect to the file and the two entities, such that the terms of the contract are ascertainable at a later date when such terms become applicable (e.g., upon failure to recall the file). As described further below, the base agreement is augmentable by external insurance contract terms from the client 14, the data itself, and external references.

At step 108, the authenticator 24 computes, from the authenticating credential, an authentication instrument by aggregating the validation token and the service specifier, the authentication instrument providing nonrepudiation assurances between the archive client 14 and the data insurer 12 about the content of the information object and the corresponding successive disposition by the data insurer 12. The authentication instrument 66, therefore, is a signed receipt of the file and the contractual terms binding the archive client 14 and the data insurer 12. Because of the authentication via the signature, each of the content of the data, the contract reference, and the identity of the parties combine to form a deterministic insurance agreement that unambiguously identifies the duties and responsibilities concerning the successive disposition of the file. In a particular arrangement, the successive disposition indicates at least a duration of the archive and a monetary damages figure for failing to accurately reproduce the file. However, the successive disposition provides a vehicle for a broad range of contractual terms to be associated with and bound to the file.

Figure 3:
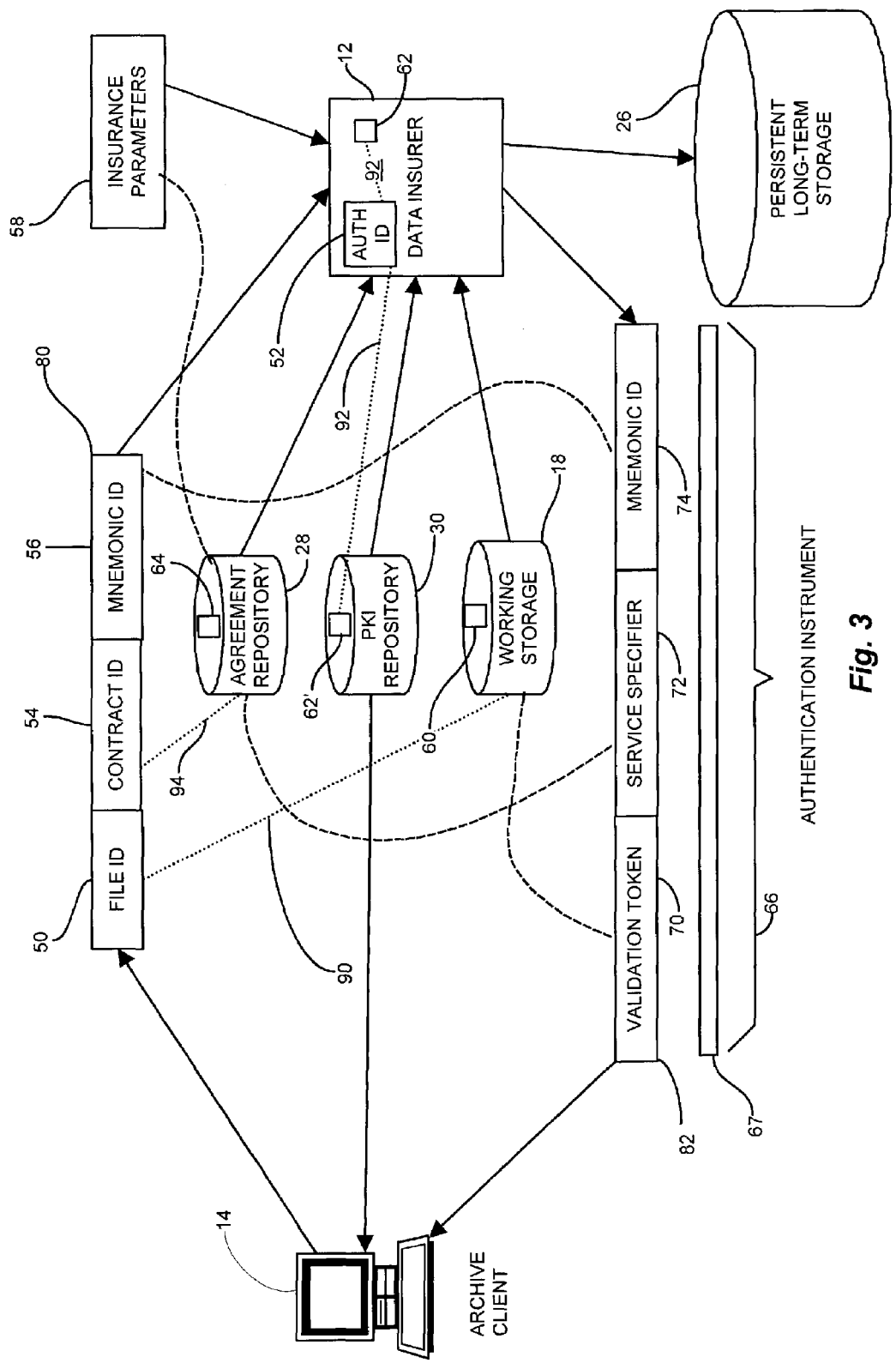
FIG. 3 shows a data flow diagram of the system of FIG. 1 generating an authentication instrument as a receipt.

FIG. 3 shows a data flow diagram of the system of FIG. 1 generating an authenticated receipt. Referring to FIGS. 3 and 1, the archive client 14 assembles and transmits an insurance descriptor 80 to the data insurer 12. The insurance descriptor 80 contains the operative fields for the insurance deposit operation. The file ID 50 identifies the actual file, or information object 60, to be stored. In particular arrangements, it may be a file handle or URL (Uniform Resource Locator) reference, the actual file, a public directory reference such as an LDAP reference, an attachment to the insurance descriptor 80, or other indexing medium. The file ID 50 unambiguously identifies the information object 60 stored in working storage 18, as shown by dotted line 90.

The authentication identifier 52 indicates the credential 62 that the authenticator 24 will use to sign the resulting receipt 82. Typically, the data insurer 12 maintains and employs its own private key to sign the receipt 82 to generate the authentication instrument 66. The authentication identifier 52 may be, for example, the actual private or symmetric key 62 of the data insurer 12, or may point to a certificate or credential 62' in the PKI repository 30, as shown by dotted lines 92, 92', respectively. Further, as typical authentication methods involve a third party certificate authority (CA), the PKI may also contain additional keying material and certificates for third party authentication via one or more CAs (chaining). The PKI repository 30, therefore, in various configurations, may be any secure or public storage medium intended to maintain adequate security over the sensitive (private) key material for authentication. It should be noted, therefore, that the authentication identifier 52 identifies the credential for authenticating the agreement between the client 14 and the data insurer 12, and may, in particular embodiments, be fulfilled by any suitable authentication mechanism as is known to those skilled in the art. The PKI repository 30, in a particular embodiment, is an LDAP directory for storing and identifying credential information such as certificates and the corresponding identity. The public key configuration disclosed is exemplary. Other mechanisms for employing cryptographic keys to generate the authenticated receipt 66 will be discussed further below.

The contract ID 54 indicates the insurance contract under which the file 60 will be insured and stored. The contract ID 54 references an ancillary, deterministic document 64 or other set of contractual terms stored in the agreement repository 28, shown by dotted line 94, and may also include agreement specific insurance parameters 58. The contract ID 54, along with the corresponding agreement 64 and insurance parameters 58, unambiguously identifies the date and terms of the storage of the file and the successive disposition of the file, such as deletion date, overwrite date, and monetary damages in the event of loss, compromise, or failure to perform according to the contract.

The insurance parameters 58 specified by the agreement are either extrinsic or intrinsic. Intrinsic parameters derive from the file 60 itself, such as size, volume or type. Extrinsic parameters derive from sources outside the file 60, and may include a specified monetary amount per file, a reference to a stock price (e.g., 10* price per share of xyz stock on the day of attempted retrieval), or other static or dynamic value. The user 14 may also specify a redundancy indicator indicative of the manner in which the data insurer 12 is to store the file 60, e.g., 3 multiple copies in different, secure underground locations, or this may remain a cost/benefit analysis for the data insurer based on the contract terms.

Finally, an archive client 14 may supply on an optional mnemonic ID 56, which allows the client 14 to track and maintain a series of file 60 insurance receipts 82 according to internal cataloging and recordkeeping to facilitate later access.

The data insurer 12 receives the insurance descriptor 80 and retrieves any indicated items from the working storage repository 18, the PKI repository 30 (such as for accessing certificate of the data insurer 12), and the agreement repository 28. The data insurer 12 assembles the receipt 82 by processing the fields of the insurance descriptor 80 as described above, and aggregates the validation token 70 corresponding to the file 60, the service specifier 72 corresponding to the insurance agreement 64 and related parameters, and the descriptive mnemonic ID 74. The data insurer 12 also writes the file 60 itself to the persistent long-term storage repository 26.

Once the data insurer 12 has completed assembly of the insurance receipt 82, the receipt 82 is signed with the credential 62 of the data insurer 12 to generate the authentication instrument 66 to return to the archive client. The authentication instrument 66 binds the identity of the file 60 to the insurance terms such that they may be irrefutably verified at such time as the client 14 attempts to retrieve the file 60 or otherwise pursue compliance with the successive disposition terms of the insurance agreement 64.

Figure 4:
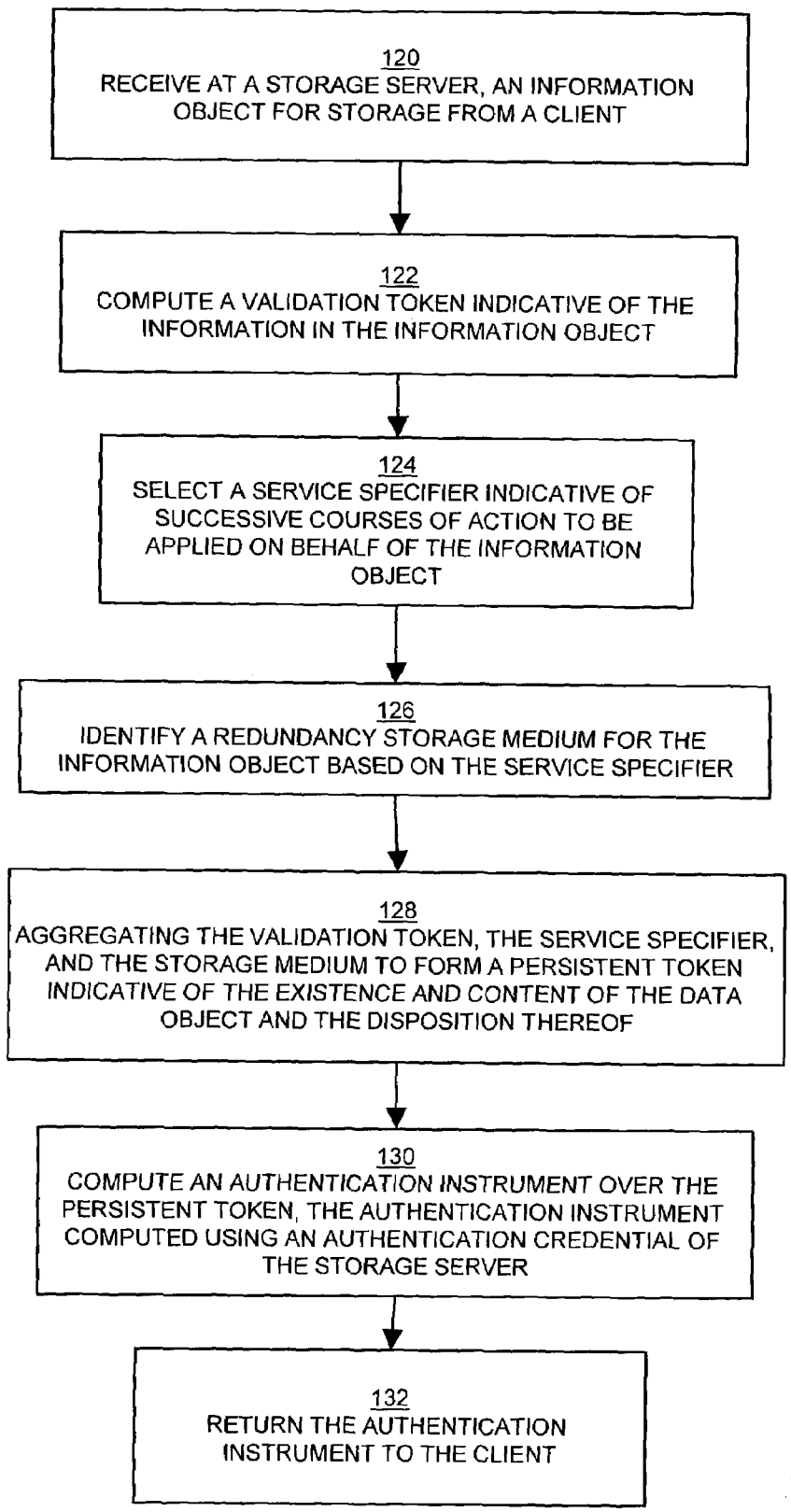
FIG. 4 shows a flowchart of the sequence of FIG. 2 in greater detail.

FIG. 4 shows a flowchart of the system in FIG. 2 in greater detail. Referring to FIGS. 4, 3 and 1, the method for associating stored information and validation criteria in a content address, or authentication instrument 66 is shown. At step 120, the storage server receives the information object 60 for storage from a client 14 in the form of an insurance descriptor 80. At step 122, the authenticator 24 computes the validation token 70 indicative of the information in the information object 60.

At step 124, the storage server 20 in the data insurer 12 selects a service specifier 72 from the contract ID 54 and agreement 64 indicative of successive courses of action to be applied on behalf of the information object 60. The service specifier 72 is also indicative of the external insurance parameters 58 that may optionally apply. Such external parameters 58 include data or information extrinsic to the actual contract in the agreement repository 28, but determinable via external means. External parameters may include, by way of example only, a stock price of a particular corporation which is verifiable through a known public exchange, or an interest rate or other value computed with reference to a published index, such as the Federal prime rate.

At step 126, the data insurer 12 identifies a redundant long-term storage medium 26 for the information object 60 based on the service specifier 72. In particular arrangements, the data insurer 12 selects the redundant long-term storage medium 26 according to a risk/benefit analysis of the costs of redundant storage and the compensation payable according to the contract 64. In alternate arrangements, the client 14 explicitly specifies in the contract 64 the redundant storage 26, specifically how many redundant instantiations of the information object 60 the data insurer 12 is to maintain. The redundant storage options vary in type, number, and locations from a single local copy to multiple tape and/or disk versions at various safeguarded (i.e., underground, staffed) facilities.

Once the storage server 20 identifies the storage locations, at step 128, the receipt manager 32 in the data insurer 12 builds the receipt by aggregating the validation token 70, the service specifier 72, and the mnemonic ID 74 to form a persistent receipt 82 indicative of the existence and content of the information object 60 and the disposition thereof. At step 130, the authenticator 24 uses the authenticating credential, or private key 62 of the data insurer 12 to compute an authentication instrument 66 over the persistent receipt 82, the authentication instrument 66 computed using the authentication credential 62 of the data insurer 12. At step 132, the insured archive storage process completes by returning the authentication instrument 66 to the client 14 for cataloging and storing as appropriate. In this manner, the client 14 merely need maintain the authenticated receipts 82, or authentication instrument 66, pending the successive disposition of the information object 60 according to the insurance contract 64. Since the authentication instrument 66 encapsulates the verifiable file 60 contents, and contract 64 in a signed (i.e., authenticated) manner along with a digital signature 67, and further clarifies the nature of the data via the mnemonic ID 74, the client 14 readily assesses successive retrieval operations and possibly failure thereof, and has specific recourse and responsibilities in such a case.

Figure 5:
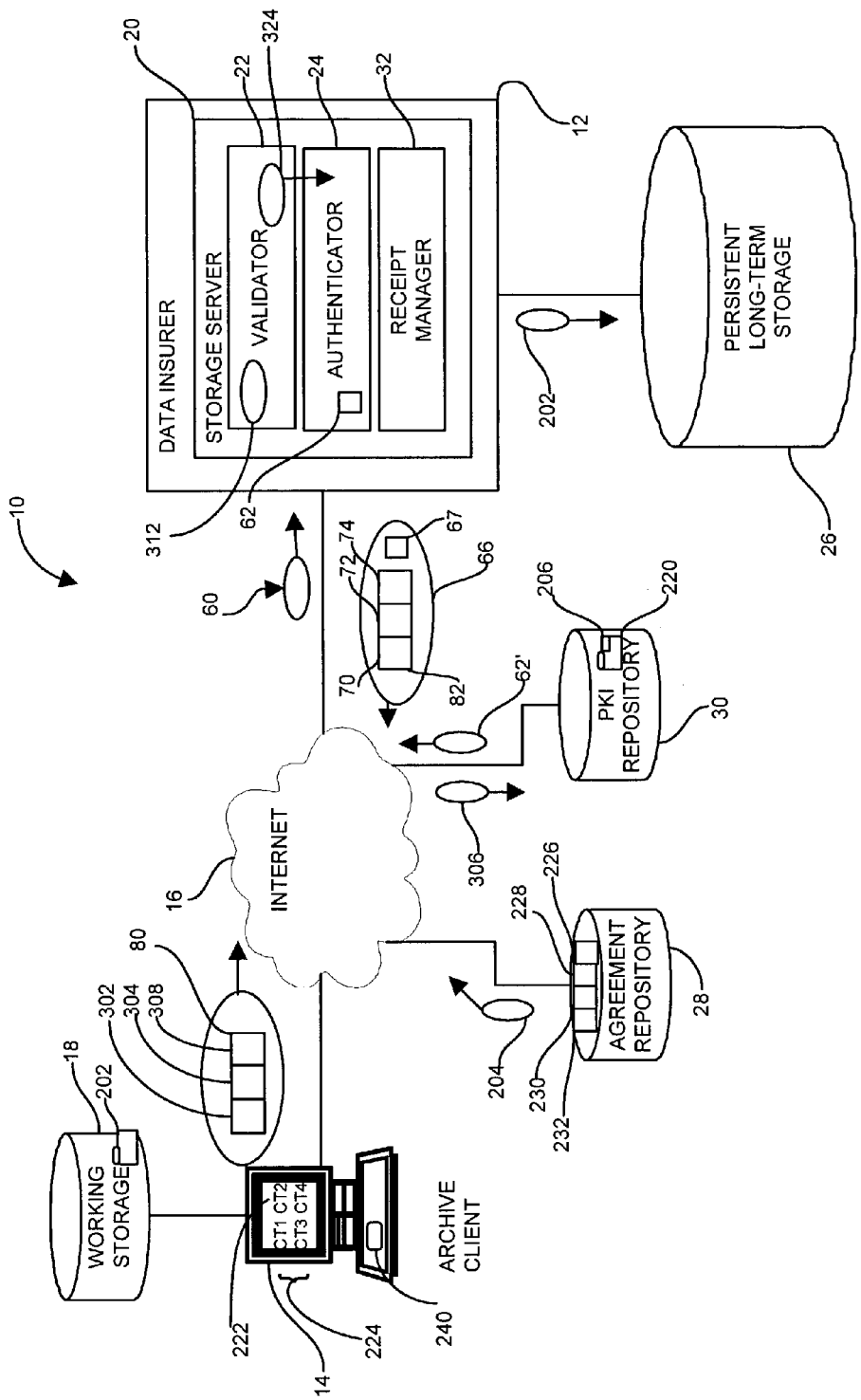
FIG. 5 shows an example of a user requesting and receiving a receipt according to a particular configuration of the present invention.

FIG. 5 shows an example of a user requesting and receiving a receipt according to a particular configuration of the present invention. Referring to FIGS. 5 and 3, an archive client 14 elects to store a plurality of files stored in folder "FOO\VIPFILES.*" 202 in the client working storage 18. The software application 230 stores the File ID 302 of the files 202 in the insurance descriptor 80.

A software application 240 running on the client 14 PC then invokes a GUI 222 to display available contract options 224 from the agreement repository 28. Using the GUI 222, the application retrieves and displays a plurality of contract options 226, 228, 230, and 232 from the agreement repository 28, which the GUI 222 displays as contract options CT1, CT2, CT3, and CT4, respectively. The client 14 selects the contract CT2 (228), which, for example, provides for 10 years archive storage at three redundant sites and a 48 hour retrieval lag. This particular contract CT2 further requires insurance parameters for the loss damages per file and the cost per megabyte of storage, the cost being 2% of the insured amount. Accordingly, the archive client 14 elects loss damages at $1000 per file or fraction of a megabyte thereof, and a cost of $20 per MB/fraction storage, or 2% of the insured value. The application 240 stores the contract ID 304 in the insurance descriptor 80. It should be noted that these values are exemplary and contract terms and insurance parameters are selectable by the archive client 14 and the data insurer 12, and presentable via the GUI 222 according to any suitable arms-length arrangement.

As indicated above, a particular implementation employs the private key (authenticating credential) 62 of the data insurer 12 to authenticate the receipt 82 and produce the authentication instrument 66. Such a public key mechanism allows the resultant receipt and associated contract to be enforced against the data insurer using the published public key corresponding to the authenticating credential 62 such as a private key. However, as is known to those skilled in the art, alternative keying schemes using either public or private keys may be employed in alternate implementations. In a particular configuration, the authenticating credential (key indicator) is selectable by the archive client 14, in which, after having selected the contract CT2 228, the archive client 14 enters an LDAP identifier 306 corresponding to the certificate 206 in the LDAP directory 220. The application 230 stores the identifier 306 in the descriptor 80 to enable successive retrieval of the selected credential, or key 62' from the PKI repository 30.

The GUI 222 also allows the archive client 14 to enter a mnemonic ID 56 to facilitate cataloging and recordkeeping of insured files on the user's behalf. The user enters "important_files_yyyymmdd" as a mnemonic ID 308. The information encapsulated in the insurance descriptor 80 is then ready for transmission to the data insurer 12.

In the example shown in FIG. 5, the authentication identifier 52, such as an LDAP directory 220 pointer, indicates the data insurer's 12 certificate 206 stored in an LDAP directory 220 in the PKI repository 30. The data insurer 12 employs an encryption key corresponding to the authentication identifier 52, such as a private key 62 or a symmetric key. In the public key configuration illustrated, the data insurer 12 maintains their private key 62 locally for security reasons, while PKI repository 30 stores the certificate 206 of the data insurer 12 containing the corresponding public key 62'. Further, such authentication may also employ a third party CA, depending on a trust level of the certificate 206 afforded by the client. Various key material and certificates of CAs is also stored in the PKI and accessible for authentication as defined herein. In this manner, the client 14 will be able to lookup the certificate 206 and corresponding key.

Alternate configurations may employ other authentication methods to bind the data insurer 12 to the receipt 82 and corresponding authentication instrument 66 which the data insurer creates from the authentication credential (private key 62). As will be apparent to those skilled in the art, various authentication mechanisms are known and typically employ a form of public or symmetric (private) key cryptography. In the public key example shown, the PKI repository 30 supports a public key authentication mechanism by providing a resource for retrieval of a public key corresponding to an authenticating private key 62. In such a PKI environment, the data insurer 12 maintains their private key 62 securely by any suitable means. While the PKI repository 30 is operable to store any of the keys or keying material for authentication, such as the certificate 206, the data insurer 12 may employ alternate secure storage for the private key portion. Other methods for maintaining sensitive key material will be apparent to those skilled in the art. The authentication instrument 66, as disclosed above, employs authentication methods using the authentication credential 62 to provide non-repudiation assurances to the client 14 that the data insurer 12 cannot disavow assenting to the contract referred to in the authentication instrument 66 because of reliance on the selected authentication mechanism.

The archive client 14 may enter commands to insure the data and trigger the archive by any suitable means. The client 14 employs the GUI 222 in the example above to facilitate arranging the fields in the descriptor 80. In alternative configurations, a command line interface (CLI), possibly integrated with an existing or legacy application, is employed. Also, the application 240 may employ the data from the GUI 224 and build a command line for the descriptor 80. A particular arrangement employs the filename as a pathname and includes the descriptor 80 fields as qualifiers, for example:

C:>REL_INS_BKUP workingdisk:/foo.vipfiles.dat/contract=CT2
/param=amt:1000/cert=mykey206
/idstring="important_files_yyyymmdd"

Other methods of command entry will be apparent to those skilled in the art.

After the application 240 assembles the descriptor 80 from the component fields 302, 304, and 308, the client 14 transmits insurance descriptor 80 to the data insurer 12 via the network 16. Alternate configurations employ a magnetic media or paper interface, for security or privacy reasons.

At the data insurer 12, the file specification 302 points to the actual files 202, which the storage server 20 retrieves for archive. The validator 22 receives the files 202 and computes a validation token 70 from a hashing function 312 in the validator 22 to yield a hash of the file 324. The data insurer 12 indexes the authentication identifier 52 to obtain the corresponding private key 62. Once the storage server 20 performs retrieval of remote data, the authenticator 24 receives the fields to be authenticated for the receipt 82. The authenticator 24 receives the hash of the file 324, the contract ID 304 for contract CT2, the related parameter amount of $1000, and the mnemonic ID 308. The authenticator concatenates the file hash 324, contract ID 304, and mnemonic ID 308 forming the receipt 82, and applies the private key 62 of the data insurer 12 to generate the authentication instrument 66 which binds the file ID 70 of the files 202 to the service specifier 72 in the authentication instrument 66, indicative of the contractual obligations in the contract 228.

The receipt manager 32 receives the authentication instrument 66 from the authenticator 24. The authentication instrument 66 includes all the fields of the receipt 82 along with the digital signature 67, encapsulated as an authenticated item, for transmission back to the user. Once the authentication instrument 66 is complete, the receipt manager 32 writes the actual data files 202 to the persistent long-term storage medium 26, which may, by way of example only, includes 3 redundant physical storage locations. After confirming the successful storage write, the receipt manager 32 sends the authentication instrument 66 controlling the receipt 82 to the client, completing the archive process.

In alternate configurations, the user interface 222 is modified to integrate with existing platforms and protocols such as NFS (Network File System). In this configuration, retrofitting of current archive and storage procedures is mitigated or eliminated. One arrangement specifies an archive directory which the data insurer 12 polls periodically to gather newly stored files according to an automatic or semiautomatic procedure. Other arrangements parse a designated storage directory for files that have modified or changed since a previous archive. In this manner, the system and methods described above are practiced with existing incremental and full backup/archive procedures.

As indicated above, the data insurer 12 and the archive client 14 employ a cryptographic authentication sequence to assure nonrepudiation of the resultant contractual agreement. In the exemplary embodiment shown, a public key implementation is discussed to illustrate a particular configuration employing a PKI using certificates stored in an public LDAP directory. In this manner, the data insurer 12 offers assurances to the archive client 14 of the recourses available should the data insurer fail to faithfully reproduce the data. Alternate configurations employing other authentication schemes will be apparent to those skilled in the art.

The exemplary configuration shown illustrates an authentication instrument 66 message (content/file name) returned to the client contains multiple portions including the references to the content 82, the contract 72, etc. encapsulated in the digital signature element (authentication instrument 66). Alternate configurations include additional fields, either explicit or included in the mnemonic ID, identifying the file and corresponding validation token 70 (hash) such that the client 14 may independently verify transmissions from the data insurer 12. The descriptor 80 and authentication instrument 66 messages are shown as exemplary. Of course the "Hash" 70 value of the content should be independently computed by both parties (client 14 and insuror/server 12), and even the values that the client 14 should send to the server might not travel together in a single message, etc.

Particular configurations employ public and private cryptographic methods in any suitable arrangement to authenticate the resulting receipt 82 and authentication instrument 66. A variety of methods are possible for the authentication to operate; the disclosed public key implementation is exemplary. The authentication operates securely and includes precautions to prevent accidental or malicious disclosure of the private key, as the private key is intended to remain secure. A typical authentication practice would be that such a PKI Repository 30 would be an entity that only stored the publicly available (that is, not-so-secret) information related to keys and identities. Accordingly, such a PKI repository 30 might be storing certificates 206, and public keys, and particularly public keys contained in certificates 206. But probably the secure portions (private half, private key, secret key component, according to the particular authentication mechanism) would be retained elsewhere by the entity that would need to use that private key for encryption/decryption or, in the configuration disclosed above, digital signing activities, while the publicly available components (public key) available via the PKI 30 to allow the verifying party (client) to obtain the authenticated contents, or receipt 82.

Those skilled in the art should readily appreciate that the programs and methods for reliable embedded content addressing as defined herein are deliverable to a processing device in many forms, including but not limited to a) information permanently stored on non-writeable-storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for reliable embedded content addressing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for processing information objects comprising:
   identifying an information object for which to apply a successive disposition;
   identifying contractual criteria associated with a first entity;
   determining a validation token indicative of the content of the information object;
   determining a service specifier indicative of contractual criteria corresponding to an obligation by a second entity to perform the successive disposition of the information object on behalf of the first entity; and
   computing, from an authenticating credential corresponding to the second entity, an authentication instrument by aggregating the validation token and the service specifier, the authentication instrument providing nonrepudiation assurances between the first and second entity about the content of the information object and the corresponding successive disposition by the second entity; the authentication instrument confirming and binding the validation token and the service specifier, the service specifier further corresponding to conditional courses of action including the disposition of the file.

2. The method of claim 1 wherein the authentication instrument is operable as a filename adapted to be stored and identified by the user and the computing the authentication instrument further comprises:
   determining a descriptive identifier corresponding to the information object and indicative of the contents of the information object; and
   appending the descriptive identifier to the authentication instrument.

3. The method of claim 1 wherein the service specifier is a deterministic index to external contractual terms, the external contractual terms indicative of
   a destruction date of the information object;
   a disclosure recourse in the event of unintended disclosure of the information object; and
   a loss recourse in the event of a failure to recall the information object via the authentication instrument.

4. The method of claim 3 wherein the service specifier further comprises at least one of:
   external, well known verifiable terms;
   embedded, deterministic terms embedded in the information object;
   definable terms computed from deterministic value specifications during the computing the authentication instrument.

5. The method of claim 4 wherein the definable terms further comprise at least one of the length of the data in the information object, the storage time of the information object, the monetary value of the information object, a compromise damage value of the information object, and a retrieval time of the information object.

6. The method of claim 4 wherein the external well known terms further comprise an established standard promulgated by a third party and published via verifiable and ascertainable sources.

7. The method of claim 1 wherein the identifying the information object, identifying the contractual criteria, and the computing the resultant authentication instrument further comprises:
   identifying an external protocol having predetermined parameters, the external protocol operable to transmit data over a public access network;
   associating the identity of the information object, the identity of the contractual criteria, and the authentication instrument with the predetermined parameters; and
   providing the information object, the contractual criteria, and the authentication instrument via the predetermined parameters.

8. The method of claim 7 wherein the external protocol is a legacy file transfer protocol adapted to be employed in preexisting applications.

9. The method of claim 1 wherein identifying the information object is performed according to predetermined criteria comprising:
   defining a set of rules concerning information objects stored in files, the rules indicative of time and storage constraints triggering the identifying;
   identifying a group of potential files for consideration;

checking, at periodic intervals, each the potential files according to the rules; and selecting, if a potential file conforms to the rules, the potential file.

10. A data communication device for processing information objects comprising:
  a storage server in the data communications device operable to receive a request from a first entity indicative of an information object and a successive disposition of the information object, the successive disposition indicative of contractual criteria associated with the first entity, the storage server further operable to identify, in an agreement repository, the contractual criteria associated with the first entity;
  a memory responsive to the storage server and operable for persistent storage and retrieval of the information objects, each of the information objects having a content;
  a validator in the storage server operable to determine a validation token indicative of the content of the information object;
  a receipt manager in the storage server operable to compute a service specifier indicative of the contractual criteria corresponding to an obligation by a second entity to perform the successive disposition of the information object on behalf of the first entity; and
  an authenticator in the storage server operable to compute, from an authenticating credential corresponding to the storage server, an authentication instrument by aggregating the validation token and the service specifier, the authentication instrument providing nonrepudiation assurances between the first and second entity about the content of the information object and the corresponding successive disposition by the second entity, the authentication instrument further comprising a filename adapted to be stored and identified by the user, the authentication instrument further including:
    a descriptive identifier corresponding to the information object and indicative of the contents of the information object.

11. The data communication device of claim 10 wherein the authentication instrument further comprises a receipt operable to confirm and bind the validation token and the service specifier, the service specifier further indicative of conditional courses of action including the disposition of the file.

12. The data communication device of claim 10 wherein the service specifier is a deterministic index to external contractual terms, the external contractual terms further comprising at least one of:
  a destruction date of the information object;
  a disclosure recourse in the event of unintended disclosure of the information object; and
  a loss recourse operable to address failure to recall the information object via the authentication instrument.

13. The data communication device of claim 10 wherein the service specifier further comprises at least one of:
  external, well known verifiable terms;
  embedded, deterministic terms embedded in the information object;
  definable terms computed from deterministic value specifications during the computing the authentication instrument.

14. The data communication device of claim 13 wherein the definable terms further comprise at least one of the length of the data in the information object, the storage time of the information object, the monetary value of the information object, a compromise damage value of the information object, and a retrieval time of the information object.

15. The data communication device of claim 13 wherein the external well known terms further comprise an established standard promulgated by a third party and published via verifiable and ascertainable sources.

16. The data communication device of claim 10 further comprising an external protocol having predetermined parameters, the data communications device responsive to the external protocol to transmit data over a public access network, the predetermined parameters operable to associate the information object, the contractual criteria, and the authentication instrument.

17. The data communication device claim 16 wherein the external protocol is a legacy file transfer protocol adapted to be employed in preexisting applications.

18. The data communication device of claim 10 further comprising a predetermined criteria operable to identify the information object, the predetermined criteria including
  a set of rules concerning information objects stored in files, the rules indicative of time and storage constraints triggering the identifying, the set of rules further operable to
  identify a group of potential files for consideration;
  poll, at periodic intervals, each the potential files according to the rules; and
  select, if a potential file conforms to the rules, the potential file.

19. The data communications device of claim 18 wherein the memory further comprises a plurality of external, redundant storage repositories each operable to shadow the information object.

20. The data communications device of claim 18 wherein the authenticator is further operable to retrieve the authentication credential from a PKI repository via the network.

21. A business method for providing archive storage services comprising:
  receiving, from a user, an information object for archive, and contractual criteria indicative of a request for archive storage services;
  identifying, in an agreement repository, an insurance agreement corresponding to the contractual criteria, the insurance agreement having insurance parameters indicative of payment amounts;
  building a service specifier indicative of the insurance agreement and the corresponding insurance parameters;
  computing a validation token indicative of the contents of the information object, the validation token providing nonmodification assurances about the information object;
  aggregating, in a data insurer, an insurance receipt comprising the validation token and the service specifier; and
  authenticating, in an authenticator, the insurance receipt to compute an authentication instrument providing irrefutable assurances according to the insurance agreement, the authentication instrument confirming and binding the validation token and the service specifier, the service specifier further corresponding to conditional courses of action including the disposition of the file.

22. The business method of claim 21 further comprising a predetermined set of contractual criteria, the contractual criteria identifiable by a user for inclusion in the insurance descriptor.

23. The business method of claim 21 wherein the payment amounts further comprise at least one of:
  payment amounts further comprise payment for storage of the information object,
  payment for loss of the information object; and
  payment for failure of performance according to the insurance agreement.

24. The business method of claim 21 wherein the information object further comprises a file identifier, and the file identifier, contractual criteria, and authentication identifier, and identifying further comprises building an insurance descriptor including the file identifier, contractual criteria, and authentication identifier.

25. A method for associating stored information and validation criteria in a content address comprising:
  receiving, at a storage server, an information object for storage from a client;
  computing a validation token indicative of the information in the information object;
  selecting a service specifier indicative of successive courses of action to be applied on behalf of the information object;
  identifying a redundancy storage medium for the information object based on the service specifier;
  aggregating the validation token, the service specifier, and the storage medium to form a persistent token indicative of the existence and content of the data object and the disposition thereof; and
  computing an authentication instrument over the persistent token, the authentication instrument computed using an authentication credential of the storage server; and
  returning the authentication instrument to the client, wherein the authentication instrument is a receipt confirming and binding the validation token and the service specifier, the service specifier further corresponding to conditional courses of action including the disposition of the file, the authentication instrument further comprising a filename adapted to be stored and identified by the user, the authentication instrument further including:
    a descriptive identifier corresponding to the information object and indicative of the contents of the information object.

26. A computer program product having a computer readable medium operable to store computer program logic embodied in computer program code encoded thereon for processing information objects comprising:
  computer program code for identifying an information object for which to apply a successive disposition;
  computer program code for identifying contractual criteria associated with a first entity;
  computer program code for determining a validation token indicative of the content of the information object;
  computer program code for determining a service specifier indicative of contractual criteria corresponding to an obligation by a second entity to perform the successive disposition of the information object on behalf of the first entity; and
  computer program code for computing, from an authenticating credential, an authentication instrument by aggregating the validation token and the service specifier, the authentication instrument providing nonrepudiation assurances between the first and second entity about the content of the information object and the corresponding successive disposition by the second entity, the service specifier being a deterministic index to external contractual terms, the external contractual terms indicative of
  a destruction date of the information object;
  a disclosure recourse in the event of unintended disclosure of the information object; and
  a loss recourse in the event of a failure to recall the information object via the authentication instrument.

27. An encoded set of processor based instructions on a computer readable storage medium having computer program code embodying program logic for directing a processor responsive to the instructions to perform steps for processing information objects comprising:
  program code for identifying an information object for which to apply a successive disposition;
  program code for identifying contractual criteria associated with a first entity;
  program code for determining a validation token indicative of the content of the information object;
  program code for determining a service specifier indicative of contractual criteria corresponding to an obligation by a second entity to perform the successive disposition of the information object on behalf of the first entity; and
  program code for computing, from an authenticating credential, an authentication instrument by aggregating the validation token and the service specifier, the authentication instrument providing nonrepudiation assurances between the first and second entity about the content of the information object and the corresponding successive disposition by the second entity, the authentication instrument further comprising a filename adapted to be stored and identified by the user and the authentication instrument further including:
  a descriptive identifier corresponding to the information object and indicative of the contents of the information object.

28. A data communication device for processing information objects comprising:
  means for identifying an information object for which to apply a successive disposition;
  means for identifying contractual criteria associated with a first entity;
  means for determining a validation token indicative of the content of the information object;
  means for determining a service specifier indicative of contractual criteria corresponding to an obligation by a second entity to perform the successive disposition of the information object on behalf of the first entity; and
  means for computing, from an authenticating credential, an authentication instrument by aggregating the validation token and the service specifier, the authentication instrument providing nonrepudiation assurances between the first and second entity about the content of the information object and the corresponding successive disposition by the second entity, the authentication instrument confirming and binding the validation token and the service specifier, the service specifier further corresponding to conditional courses of action including the disposition of the file.

\* \* \* \* \*